(12) United States Patent
Duffett-Smith et al.

(10) Patent No.: US 7,260,407 B2
(45) Date of Patent: Aug. 21, 2007

(54) RADIO LOCATION SYSTEM MEASUREMENT UNIT

(75) Inventors: Peter James Duffett-Smith, Cambridge (GB); James Paul Brice, Cambridge (GB); John Christopher Clarke, Cambridge (GB)

(73) Assignee: Cambridge Positioning Systems Ltd., Cambridge (GB)

( * ) Notice: Subject to any disclaimer, the term of this patent is extended or adjusted under 35 U.S.C. 154(b) by 720 days.

(21) Appl. No.: 10/476,225

(22) PCT Filed: Apr. 18, 2002

(86) PCT No.: PCT/GB02/01812

§ 371 (c)(1),
(2), (4) Date: Oct. 29, 2003

(87) PCT Pub. No.: WO02/091015

PCT Pub. Date: Nov. 14, 2002

(65) Prior Publication Data

US 2004/0097241 A1   May 20, 2004

(30) Foreign Application Priority Data

May 4, 2001   (EP)   ................... 01304077

(51) Int. Cl.
*H04Q 7/20*   (2006.01)
(52) U.S. Cl. .................................................. 455/456.1
(58) Field of Classification Search .............. 455/456.1
See application file for complete search history.

(56) References Cited

U.S. PATENT DOCUMENTS

| | | | |
|---|---|---|---|
| 5,838,279 A | 11/1998 | Duffett-Smith et al. | 342/459 |
| 6,094,168 A | 7/2000 | Duffett-Smith et al. | 342/463 |
| 6,275,705 B1 | 8/2001 | Drane et al. | 455/456 |
| 6,342,854 B1 | 1/2002 | Duffett-Smith et al. | 342/457 |
| 6,522,890 B2 | 2/2003 | Drane et al. | 455/456 |
| 6,529,165 B1 | 3/2003 | Duffett-Smith et al. | 342/463 |

FOREIGN PATENT DOCUMENTS

| | | |
|---|---|---|
| EP | 1118871 | 7/2001 |
| EP | 1235076 | 8/2002 |
| EP | 1255122 | 11/2002 |
| EP | 1271178 | 1/2003 |
| EP | 1278074 | 1/2003 |
| EP | 1185877 | 3/2003 |
| EP | 1185878 | 3/2003 |
| EP | 1301054 | 4/2003 |
| WO | 9730360 | 8/1997 |

*Primary Examiner*—William D. Cumming
(74) *Attorney, Agent, or Firm*—Roylance, Abrams, Berdo & Goodman, L.L.P.

(57) ABSTRACT

A location measurement unit 401 for a radio location measuring system has two or more coupling devices 404, 405 for picking up the signals from a plurality of base transceiver stations (BTSs) of a cellular radio communication system. A switching device 510, is connected to the coupling devices, for switching between the signals picked up by the coupling devices and/or one/two or more receivers 510, 610-613 are connected to respective coupling devices, for receiving the signals picked up by the coupling devices. A processor 512, 614 is connected to the or each receiver, for processing the signals output by the receiver. A communications link 513, 615 is connected to the processor, for transferring the processed signals to a calculation node 514.

13 Claims, 7 Drawing Sheets

RADIO LOCATION SYSTEM MEASUREMENT UNIT

BACKGROUND OF THE INVENTION

1. Field of the Invention

The present invention relates to radio location systems and, more particularly, to radio location measurement units used in radio location systems for locating the positions of cellular radio telephones (mobile stations).

2. Description of the Related Art

There are many systems known in the art by which the position of such a mobile station can be determined. Of particular relevance here are those systems for locating mobile stations in mobile telephone communications networks. One such method, known by its standardised acronym as E-OTD (Enhanced-Observed Time Difference) uses the relative timing offsets of signals received from the network transmitters by a mobile station, together with the relative timing offsets of the same signals received by a fixed receiver whose position is known. The second set of measurements by the fixed receiver is required since the transmissions may not be synchronised with respect to each other so that their relative transmission time offsets (i.e. the offsets in the times at which identical parts of the signals are transmitted from different transmitters) are constantly varying and otherwise unknown.

Two principal, and different, methods of using the timing offsets in the position computation have been described in the art. In one, e.g. EP-A-0767594, WO-A-9730360 and AU-B-716647, the details of which are hereby incorporated by reference, the signals measured by the fixed receiver are used, in effect, to 'synchronise' the transmissions from the different transmitters. The instantaneous transmission time offsets of each transmitter relative to its neighbours are calculated from the values measured at the fixed receiver using the known positions of the fixed receiver and the transmitters. The timing offsets measured by the mobile station can then be used in a calculation based on well-known standard techniques in which the points of intersection of two or more hyperbolic position lines predicts the position of the mobile station.

The other method (see our EP-B-0303371, U.S. Pat. No. 6,094,168 and EP-A-1025453 the details of which are hereby incorporated by reference and which refer to a system known as CURSOR®) makes use of the measurements made by both the fixed receiver and the mobile station to calculate the relative time difference between the signals received from each transmitter by both receivers. This results in a calculation based on the intersection of circles centred on the transmitters.

In our WO-A-0073813, the details of which are hereby incorporated by reference, we have shown how the E-OTD technique can be further refined for large networks by combining the measurements from two or more of the fixed receivers (the so-called Location Measurement Units: LMUs), each of which can only receive signals from a subset of the transmitters in the network, to produce a list of the measurements that would have been provided by a single unit, the Virtual LMU (VLMU) had it been able to receive transmissions from the entire network. This technique may be a required element of any practical implementation of E-OTD.

All E-OTD systems require the measurement of the times of arrival of radio signals from at least three transmitters at both the mobile station (MS) and at least one LMU whose position is known or can be calculated.

It is convenient to install the necessary LMUs at (i.e. co-located with) the existing base transceiver stations (BTSs) which are used to transmit and receive the communications signals to and from the mobile stations. By doing so the network operators avoid the need to obtain additional costly sites for their LMUs, and also have access to the site services and communications channels used by the BTS itself. However, field trials have shown, surprisingly, that signals from some distant BTSs are often more reliably received by an LMU than those from its co-located BTS. Investigations have shown that, in particular, it is difficult to place the LMU antenna so that all of the locally transmitted channels are received properly at the same time as receiving the signals from the distant BTSs. Further examination indicates that this problem is not as a result of signal strength levels, which are always strong in the vicinity of the BTS (although not usually so strong as to block the receipt of other signals). Instead, the problem is caused by the interference effects from "local scatterers", such as the ground and nearby buildings, which often cause the received signals to be delayed by substantial, variable, and unknown amounts. This leads to the significant problems that (a) the VLMU must rely on measurements of the 'local' BTS signals made by 'distant' BTSs with the consequent uncertainties in the propagation paths, and (b) in the case that GPS or some other 'absolute' timing reference is being used, the 'local' signals cannot be accurately measured. The result is that, if coverage of the local BTS cells cannot be guaranteed by the co-located LMU, it becomes very difficult for the location system to guarantee coverage of the entire BTS network.

There is a need therefore to overcome this problem if the advantages of co-locating LMUs and BTSs are to be retained.

SUMMARY OF THE INVENTION

According to a first aspect of the present invention therefore there is provided a location measurement unit (LMU) for a radio location measuring system, the LMU having two or more coupling devices for picking up the signals from a plurality of base transceiver stations (BTSs) of a cellular radio communication system;

a single, multiple-input switching device connected to the coupling devices, for switching between the signals picked up by the coupling devices;

a receiver connected to the switching device, for receiving the signals from a selected coupling device;

a processor connected to the receiver, for processing the signals output by the receiver; and a communications link connected to the processor, for transferring the processed signals to a calculation node.

By connecting more than one coupling device to the LMU, a means is provided which allows the LMU to take reliable and accurate measurements of co-located BTS cells as well as of distant BTS cells, in particular substantially reducing or eliminating the interference caused by local scattering.

A coupling device may, for example, be a conventional antenna, a direct connection to a BTS output port, or a specialised stub antenna within the BTS (a so-called 'sniffer antenna').

An LMU need not contain a switching device if it has multiple receivers, and therefore, according to a second aspect of the present invention, therefore there is provided a location measurement unit (LMU) for a radio location measuring system, the LMU having two or more coupling devices for picking up the signals from a plurality of base transceiver stations (BTSs) of a cellular radio communication system;

two or more receivers connected to respective coupling devices, for receiving the signals picked up by the coupling devices;

a processor connected to the receivers, for processing the signals output by the receivers; and a communications link connected to the processor, for transferring the processed signals to a calculation node.

An LMU may incorporate combinations of receivers and switching devices, for example one with three coupling devices, a switch, and two receivers.

The invention includes a combined or co-located BTS and LMU.

Furthermore, an LMU need contain neither a switching device nor multiple receivers if it has a data link to the local BTS's processor(s) in order to acquire the transmitted data directly rather than from the transmitted radio signals.

According to a third aspect of the present invention therefore, there is provided a location measurement unit (LMU) for a radio location measuring system, the LMU having a coupling device for picking up the signals from a plurality of base transceiver stations (BTSs) of a cellular radio communication system;

one or more data links to a local base transceiver station (BTS) data processor;

a receiver connected to the coupling device, for receiving the signals picked up by the coupling device;

a processor connected to the receiver and to the data link or links, for processing the signals output by the receiver and the data link or links; and a communications link for transferring the processed signals to a calculation node.

The data link may be a physical connection such as a cable between separate LMU and BTS processors or, in a preferred embodiment, the LMU and local BTSs may share a processor in which case the data link can be a software element.

The invention also includes LMUs incorporating combinations of receivers, switching devices, and direct data links, for example an LMU with three sensing devices, a switch, two receivers and a data link.

BRIEF DESCRIPTION OF THE DRAWINGS

Examples of LMUs according to the present invention will now be described with reference to the accompanying drawings, in which.

DETAILED DESCRIPTION OF EXEMPLARY EMBODIMENTS

Figure 1:
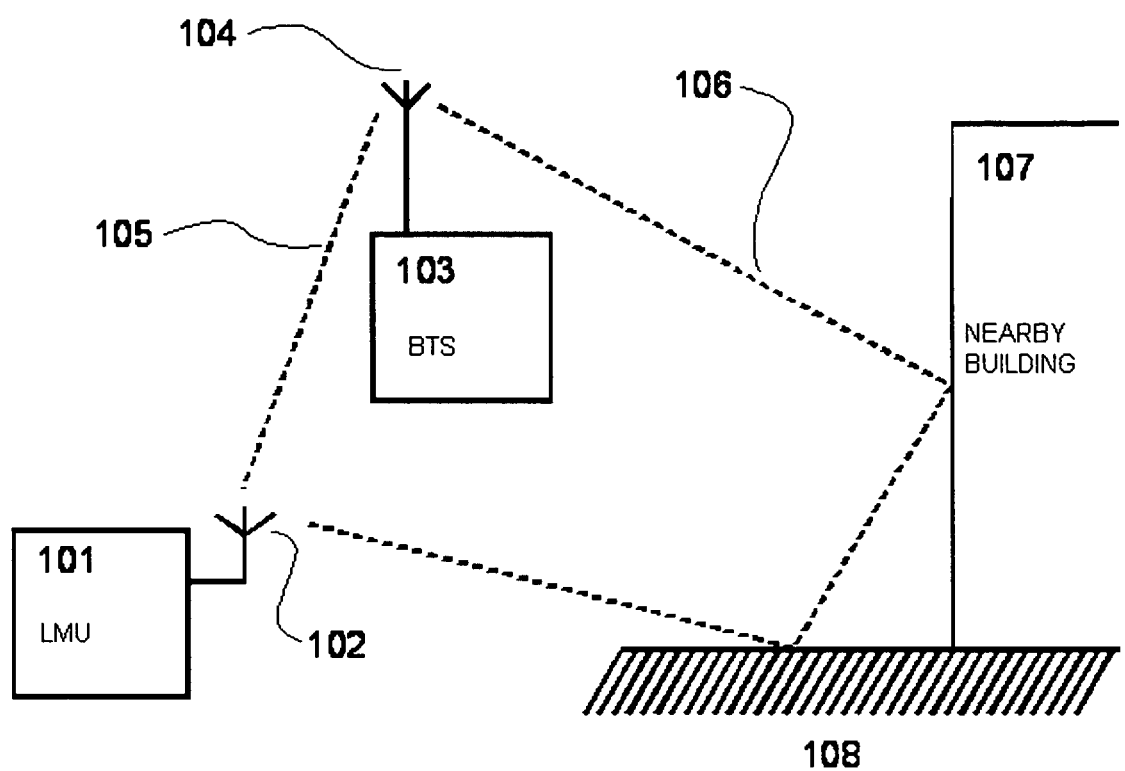
FIG. 1 illustrates a reflection mechanism by which signals are received by an LMU antenna from the forward beam of a BTS.

The problem associated with co-location of an LMU at a BTS site is caused by scattering and reflection from local objects such as buildings, trees, etc of the very bright signals radiated forward by the BTS antenna, as explained above. One such mechanism is illustrated in FIG. 1, which shows a BTS 103 connected to a transmitting antenna 104, and an LMU 101 connected to a receiving antenna 102. The transmitted signal 106 is reflected back to the LMU antenna 102 by the 'corner reflector' formed between a nearby building 107 and the ground 108. The reflected signal interferes with the signal 105 received directly from the back-lobe of the transmitting antenna 104 in a manner which is both unpredictable and variable. It would take just a half-wavelength change in the reflected signal path, for example, to transform from constructive to destructive interference at the LMU antenna, a few centimeters change in the path at GSM frequencies. The result is that the LMU reports a timing for the local signal which may be several hundred meters late, which changes throughout the day, and is sensitive to temperature.

The problem can be solved by making sure that the LMU measures the local BTS signals uncontaminated by local scattering components. Three methods of doing so are illustrated in FIGS. 2 to 4.

Figure 2:
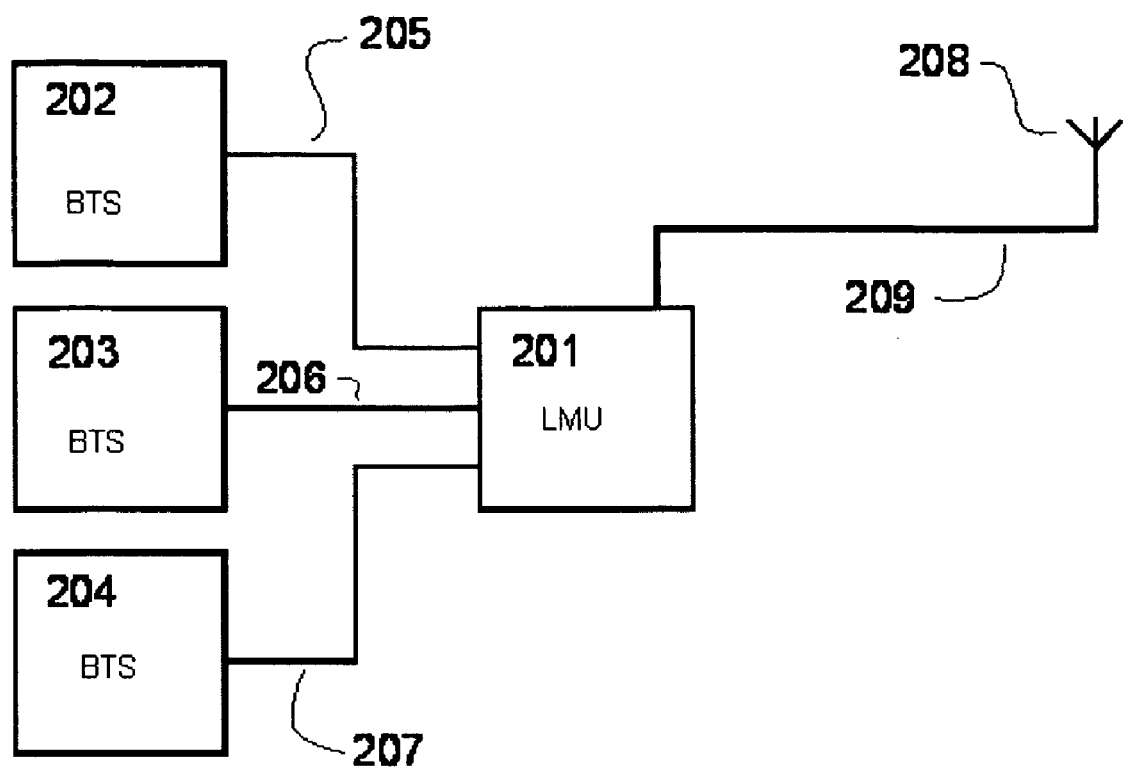
FIG. 2 illustrates an example of an LMU connected to an external antenna and to local BTS equipment.

FIG. 2 illustrates direct connection of an LMU 201 to its co-located BTSs 202, 203, 204, as well as receiving the signals from remote BTSs using a conventional antenna 208. The LMU 201 receives the signals generated by the co-sited BTS transmitters, 202, 203, 204, via coupling devices in the form of direct connections 205, 206, 207. These could, for example, be connected to standard monitoring points of the BTS transmitters, or may convey signals generated earlier in the BTS equipment chain. Another coupling device in the form of a conventional antenna 208 picks up the signals from distant BTSs, and is connected to the LMU 201 via a cable 209.

Figure 3:
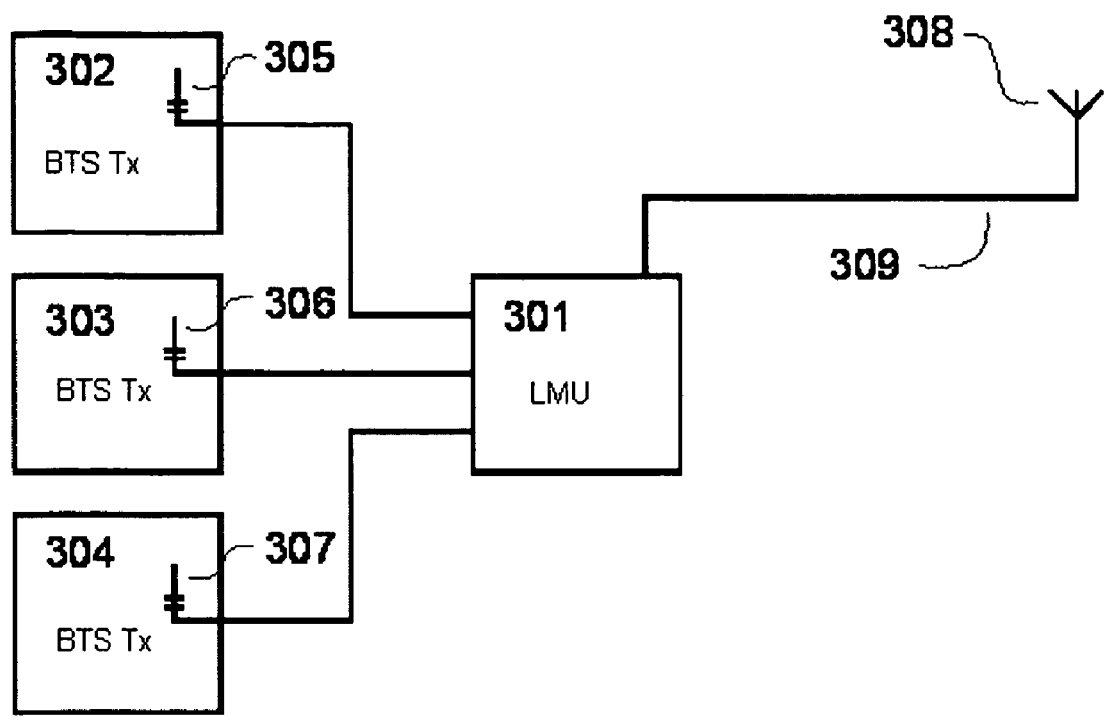
FIG. 3 illustrates an example of an LMU connected to an external antenna and to local 'sniffer' antennas.
Figure 4:
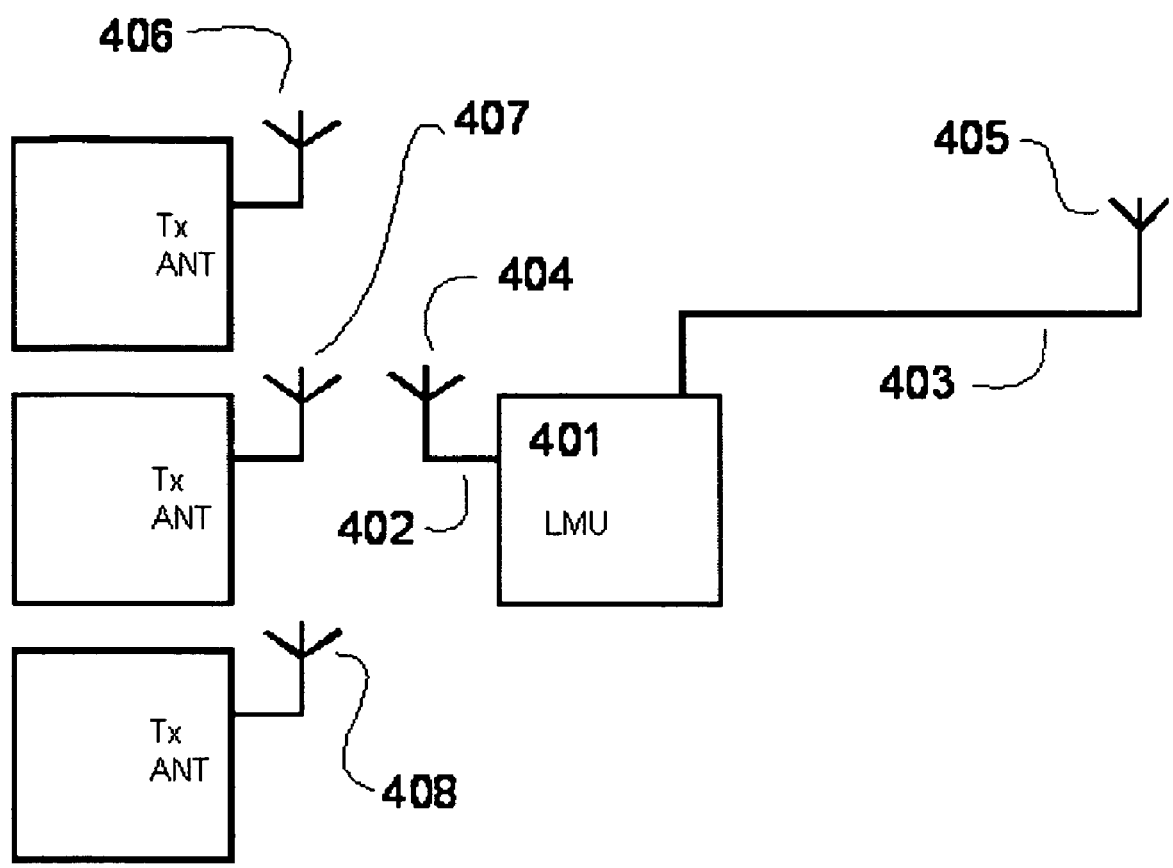
FIG. 4 illustrates an example of an LMU connected to more than one external antenna.

An alternative to direct connection of an LMU to BTS equipment is illustrated in FIG. 3. In this example, an LMU 301 receives the signals generated by the co-sited BTS transmitters, 302, 303, 304, via coupling devices in the form of internal 'sniffer' antennas 305, 306, 307. These antennas could be, for example, stub antennas located inside the BTS equipment cabinets. Although the BTS equipment is usually well screened, the power levels of locally-generated signals inside the cabinet are likely to be much greater than signals penetrating from the outside. Again, a further coupling device in the form an external antenna 308 picks up the signals from distant BTSs, and is connected to the LMU 301 via a cable 309.

In some circumstances, it may be possible to use more than one external antenna without needing to use internal monitoring as just described. This is shown in FIG. 4. An LMU 401 is connected via cables 402 and 403 to coupling devices in the form of external antennas 404 and 405. These external antennas are positioned such that one external antenna 405 is able to pick up the signals from remote BTSs as well as possible, whilst the other antenna 404 is able to pick up the locally-generated signals, for example, by placing it close to the transmitting antennas 406, 407 and 408. Clearly, some installations might use three or more external antennas (providing some coupling devices) with, or without internal connections (providing other coupling devices) as well. The external antennas 404, 405 could also be adapted to make use of the different polarisation states of local and distant signals, or could be directional antennas.

Figure 5:
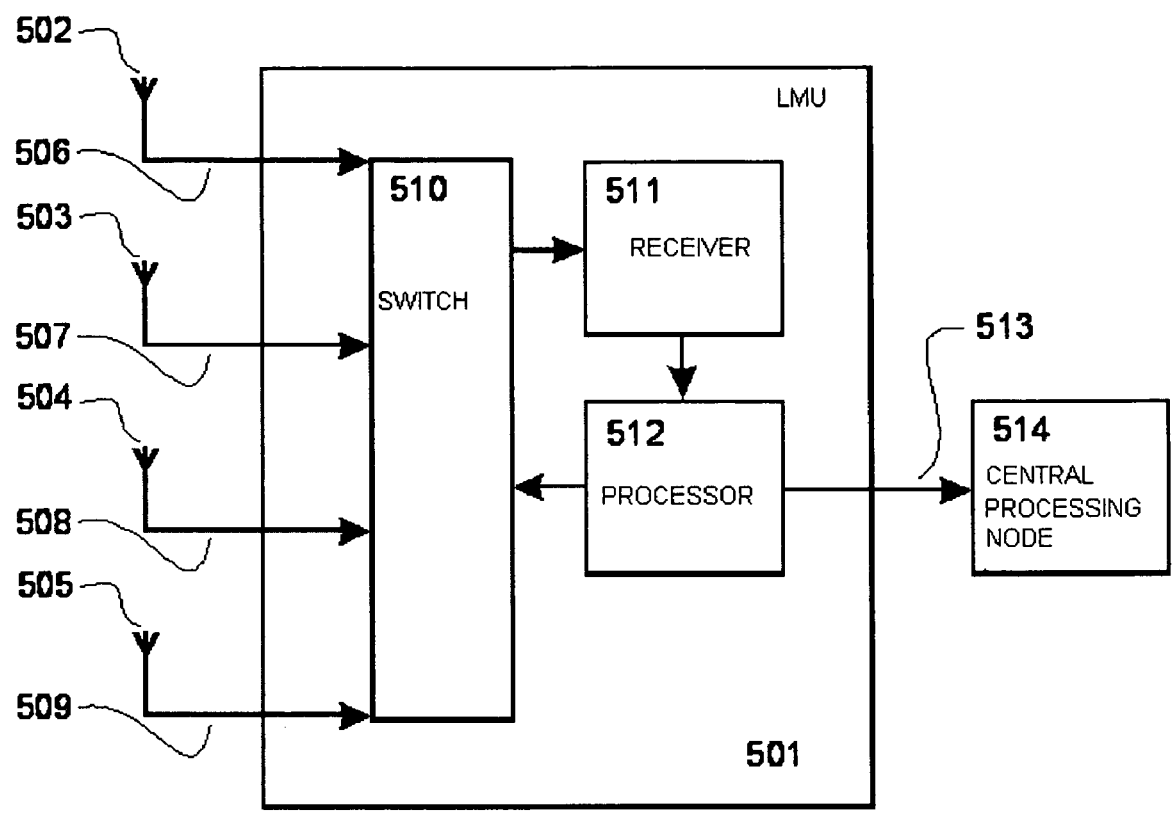
FIG. 5 shows a block diagram of a multi-input LMU incorporating a switch.

There are several ways in which the different signals presented to a multi-input LMU can be processed. One way is illustrated in FIG. 5. An LMU 501 has several inputs, 506, 507, 508, 509, which connect antennas 502, 503, 504, 505 to a switch 510. Three of the inputs, say 506-508 could be inputs from the co-located BTS (not shown, but of one of the types illustrated in FIGS. 3 and 4) and the fourth input 509 could be an input for receiving signals from a remote BTS (not shown, but again as described with reference to FIGS. 2 to 4). The switch 510 could, for example, be a PIN diode switch or any other low-loss type suitable for switching RF signals. The output of the switch 510 is connected to a receiver 511, which in turn is connected to a processor 512. The output of the LMU 501 is transmitted back to the central processing node 514 of the location system via a link 513. In use, the processor 512 controls the operation of the switch 510 according to a software program running on it and which is designed to select the best combination of the received signals for use by the location system. In a modification, the inputs 506-508 could be direct connections as shown in FIG. 2.

Figure 6:
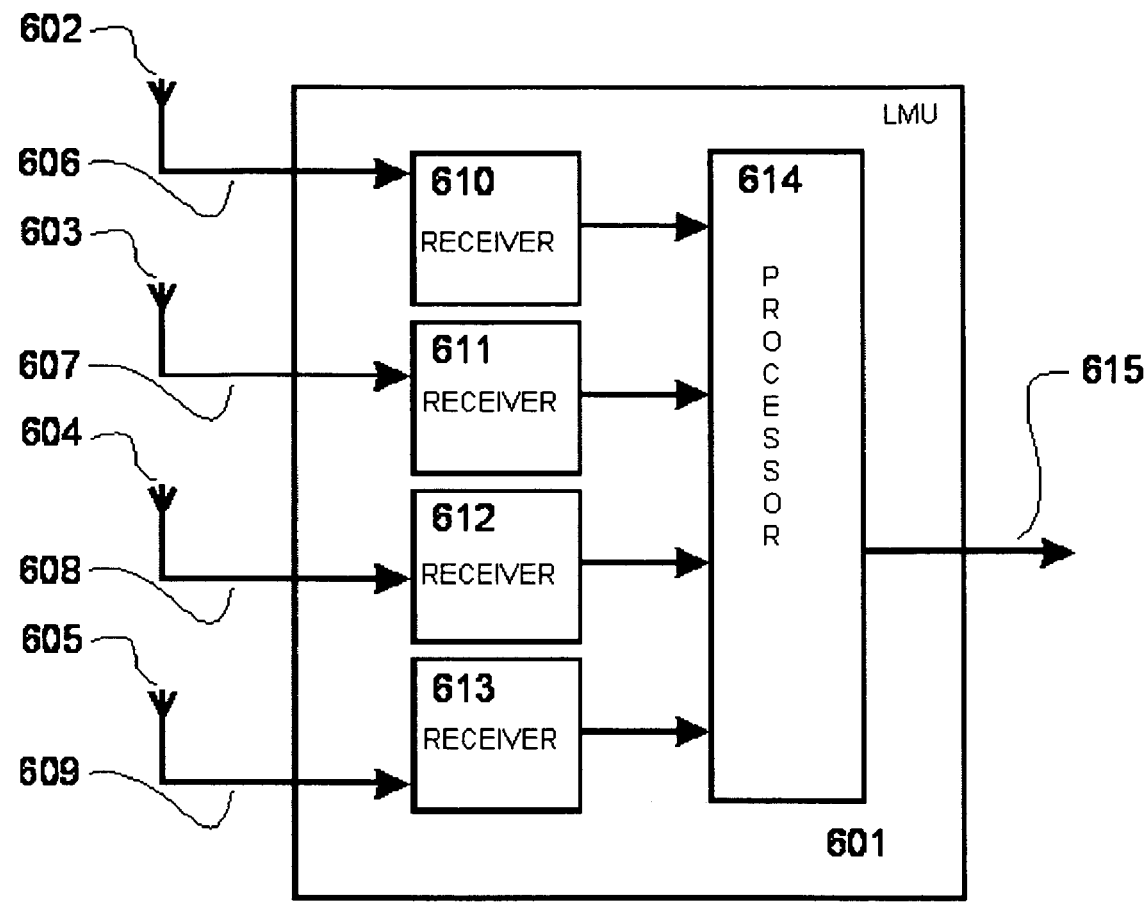
FIG. 6 shows a block diagram of a multi-input LMU incorporating more than one receiver.

An alternative arrangement is illustrated in FIG. 6. An LMU 601 has several antennas 602, 603, 604, 605 connected to inputs 606, 607, 608, 609 (as described above in connection with FIG. 5 say), each of which is connected to a separate receiver 610, 611, 612, 613. This is likely to be a more expensive arrangement than that described in the preceding paragraph in connection with FIG. 5, but offers the advantage that all of the signals received on the various inputs can be processed in parallel rather than sequentially, thus making more accurate measurements. The receivers are all connected to a processor 614 and there is a communications link 615 as before. In a modification, the inputs 606-608 could be direct connections as shown in FIG. 2.

Figure 7:
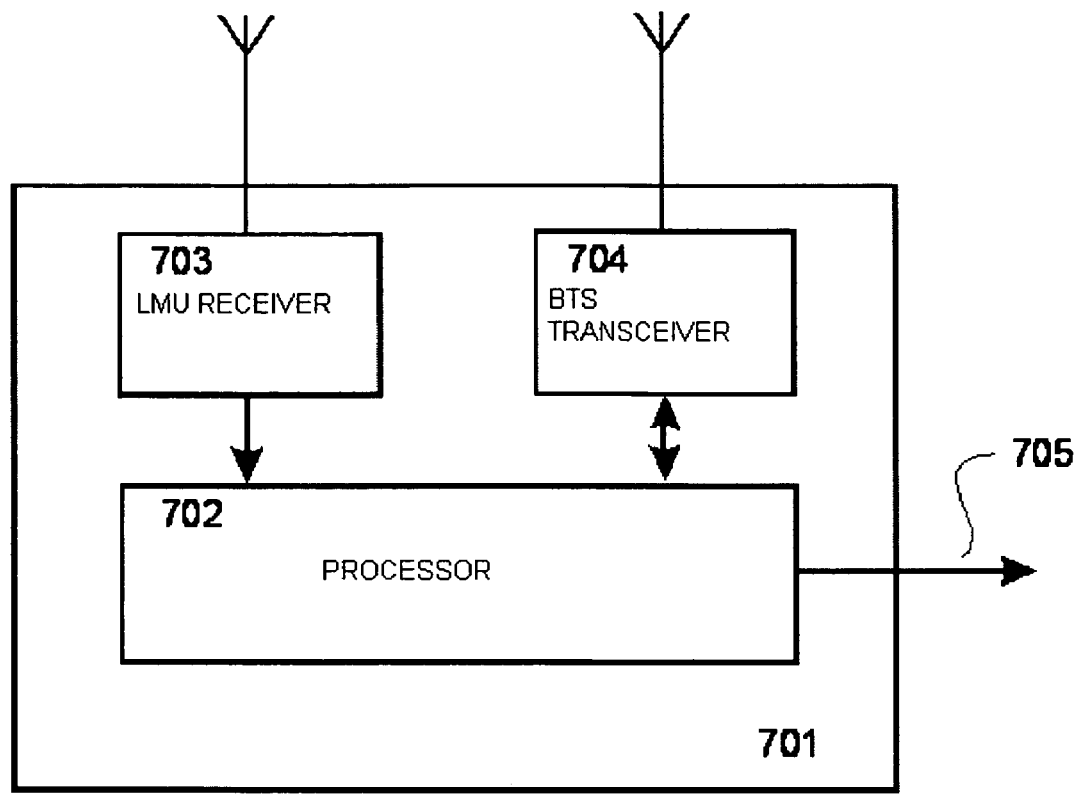
FIG. 7 shows a combination LMU & BTS which share a processor.

A third arrangement is illustrated in FIG. 7 in which the LMU and BTS are combined into a single unit 701 sharing a common processor 702. The processor supports both the LMU receiver 703 (which has a coupling device in the form of an antenna 706) and the BTS transceiver 704 (which has an antenna 707), thus allowing the data link between local BTS and LMU to be implemented as a software element. The LMU is provided with a communications link 705 in order to transmit its output to a central processing node.

In all of these cases, an LMU may also incorporate a standard timing reference, such as that provided by a GPS system, so that it can make measurements against a standard network-wide reference clock.

The invention claimed is:

1. A location measurement unit (LMU) for a radio location measuring system, the LMU having
two or more coupling devices for picking up the signals from a plurality of base transceiver stations (BTSs) of a cellular radio communication system;
a single, multiple-input switching device connected to the coupling devices, for switching between the signals picked up by the coupling devices;
a receiver connected to the switching device, for receiving the signals from a selected coupling device;
a processor connected to the receiver, for processing the signals output by the receiver; and
a communications link connected to the processor, for transferring the processed signals to a calculation node.

2. A location measurement unit (LMU) for a radio location measuring system, the LMU having
two or more coupling devices for picking up the signals from a plurality of base transceiver stations (BTSs) of a cellular radio communication system;
two or more receivers connected to respective coupling devices, for receiving the signals picked up by the coupling devices;
a processor connected to the receivers, for processing the signals output by the receivers; and
a communications link connected to the processor, for transferring the processed signals to a calculation node.

3. A location measurement unit according to claim 1 and claim 2, the LMU having a combination of receivers and switching devices connected to the coupling devices.

4. A location measurement unit according to claim 3, having three coupling devices, a switch connected to two of the coupling devices, and two receivers, one connected to the third coupling device and the other connected to the switch.

5. A location measurement unit according to any of claims 1 to 4, wherein the coupling devices include one or more of a conventional antenna, a direct connection to a BTS output port, or a specialised stub antenna within a base transceiver station.

6. A location measurement unit (LMU) for a radio location measuring system, the LMU having
a coupling device for picking up the signals from a plurality of base transceiver stations (BTSs) of a cellular radio communication system;
one or more data links to a local BTS data processor;
a receiver connected to the coupling device, for receiving the signals picked up by the coupling device;
a processor connected to the receiver and to the data link or links, for processing the signals output by the receiver and the data link or links; and
a communications link for transferring the processed signals to a calculation node.

7. A location measurement unit according to claim 6, wherein the data link comprises a physical connection between separate LMU and BTS processors.

8. A location measuring unit according to any of claims 1 to 7, wherein the or each receiver comprises a cellular radio telephone receiver.

9. A cellular radio telephone base transceiver station co-located with a location measuring unit according to any of claims 1 to 8.

10. A cellular radio telephone base transceiver station (BTS) incorporating a location measurement unit (LMU) according to claim 6 or claim 7, the BTS and LMU having a common processor, and the data link comprising a software routine running within the processor.

11. A location measurement unit according to claim 1, claim 2 and claim 6, the LMU having a combination of receivers, switching devices connected to the coupling devices and direct data links.

12. A cellular radio telephone system incorporating one or more co-located base transceiver stations and location measuring units according to any of claims 9 to 11.

13. A location measuring system incorporating a cellular radio telephone system according to claim 12.

* * * * *